Patented Apr. 13, 1954

2,675,324

UNITED STATES PATENT OFFICE 2,675,324

MANUFACTURE OF REFRACTORY MATERIALS

Terence Stanley Busby, Kingsbury, and John Henry Partridge, Pinner, England, assignors to The General Electric Company Limited, London, England No Drawing. Application January 10, 1951, Serial No. 205,437

13 Claims. (Cl. 106—67)

This invention relates to refractory materials, and more particularly to coherent bodies of refractory materials of the silico-aluminous type, suitable for use as blocks for the construction of tank furnaces for glass manufacture. The invention also relates to a method of manufacturing such coherent bodies.

An important requirement of the refractory blocks of which tank furnaces used for glass manufacture are constructed is that they shall resist the corrosive attack of the molten glass, and of the mixture of raw materials for making the glass, which are contained in the tank during the glass manufacturing process. Furthermore, low porosity is a very desirable property of the blocks, in order to reduce to a minimum disintegration of the blocks due to penetration of corrosive agents beneath the surfaces of the blocks. A further requirement of the tank furnace blocks is that they shall withstand, without marked deformation, the high temperatures to which they are heated during the manufacture of the glass.

These refractory tank furnace blocks are usually made from materials which are predominantly composed of aluminium silicates, such as clay or sillimanite, the blocks being formed by moulding the raw materials to the desired shape and then baking, possibly with a flux, to a high temperature such that the clay or other silico-aluminous material initially present is dehydrated and is converted mainly into mullite, a crystalline silico-aluminous substance of the composition $3Al_2O_3.2SiO_2$, with the liberation of silica. The refractory blocks thus reduced therefore consist essentially of mullite crystals bonded together by a vitreous matrix, the proportion of vitreous matrix present being determined partly by the amounts of impurities initially present in the raw material, partly by the amount of free silica present in the vitreous state as a result of the baking of the moulded blocks, and partly by the amount of flux, if used. The vitreous matrix may form about 50% of the material of the blocks made in this way.

At the high temperatures to which tank furnace blocks are subjected during the manufacture of glass in the furnace, the vitreous matrix of the refractory blocks made as described above is of sufficiently low viscosity to be capable of flowing and hence, in the proportions usually present, of giving rise to deformation of the blocks. Also the vitreous matrix is more readily attacked by the molten glass or constituents thereof than is the crystalline mullite component of the blocks. It is therefore desirable to decrease the proportion of vitreous matrix present in the refractory blocks, and/or to increase the viscosity of the vitreous matrix at high temperatures, in order to increase the rigidity and resistance to corrosion of the blocks at the operating temperatures of the furnace.

It is known to manufacture tank furnace blocks having a higher mullite content than those described above by the method of fusion casting, that is to say by fusing the raw materials, usually comprising clay and bauxite, in a furnace, for example an electric furnace, and casting the molten material in a mould. However, blocks hitherto manufactured by this method usually still contain a considerable proportion of vitreous matrix, of the order of 30% or more.

It is one object of the present invention to provide coherent bodies of refractory material of the silico-aluminous type containing less than 30% of vitreous matrix, which bodies can be obtained with very low porosity, and which when used in the form of blocks for the construction of tank furnaces for glass manufacture, have a good resistance to corrosion and disintegration by the molten glass. It is another object of the invention to provide a method of manufacturing such bodies.

According to one aspect of the invention, a coherent body of refractory material, suitable for use in block form for the construction of a tank furnace for glass manufacture, consists substantially of crystals of mullite bonded together by vitreous siliceous material, the said vitreous material constituting less than 30% by weight of the composition of the body.

According to another aspect of the invention, a method of manufacturing a coherent body of a refractory material of the silico-aluminous type includes the step of heating a mixture consisting of china clay and alumina, possibly together with small proportions of plasticiser and flux, the proportion of alumina being between 15% and 45% of the mixture, and the heating being carried out for at least 24 hours at a temperature above 1500° C. but below the fusion temperature of the mixture. Percentages, here and hereinafter, are by weight.

For imparting a desired shape to the body the mixture may be moulded to the required shape before the heating, as will be further described later.

The term "china clay" is used herein in the well known sense, namely as a generic term including clays composed substantially of the hydrated aluminium silicate $Al_2O_3.2SiO_2.2H_2O$ and containing only small proportions of impurities such as felspars, mica, free silica, and iron compounds. For the manufacture of refractory materials china clays derived directly from the degradation of granites are the most satisfactory, and for the purpose of the present invention it is preferred to use a china clay of this type of the highest purity commercially available.

The hydrated aluminium silicate which is the essential constituent of the china clay decomposes on heating to a temperature above 1000° C. to form mullite, $3Al_2O_3.2SiO_2$, and free silica, the reaction being represented as follows:

$3(Al_2O_3.2SiO_2.2H_2O) \rightarrow 3Al_2O_3.2SiO_2 + 4SiO_2 + 6H_2O$

A refractory material obtained by heating clay alone thus comprises crystals of mullite in a vitreous matrix composed of the silica liberated and the impurities initially present in the clay. When china clay is heated in admixture with alumina, in accordance with the present invention, the alumina combines with the silica liberated on decomposition of the clay, to form more mullite, hence increasing the proportion of crystalline material, and descreasing the proportion of vitreous matrix, in the final product. Moreover substantially pure china clay contains a higher proportion of alumina and a lower proportion of free silica and other mineral impurities than is the case with other clay materials, so that the product obtained on heating china clay contains a higher proportion of mullite crystals and a lower proportion of vitreous matrix than other clays. Moreover the vitreous matrix formed on the decomposition of china clay is more viscous than that produced by the decomposition of other clays containing a greater proportion of impurities.

The alumina used in the method of the invention is preferably in a calcined form. The amount of alumina employed should not be less than 15% since this is the minimum required to combine with sufficient silica to ensure that the product contains less than 30% of vitreous material, and preferably is not greater than that required to combine with all the silica produced by decomposition of the clay on heating, to form mullite, that is to say, not more than about 79% by weight of the weight of the hydrated aluminium silicate of which the clay is mainly composed, or 45% of the initial mixture to be heated, for the presence of an appreciable excess of alumina renders the production of a coherent body difficult, requiring excessively high temperatures. The actual maximum amount of alumina which it is convenient to use in any particular case depends upon the temperature to which the mixture of clay and alumina can be heated; or conversely, the firing temperature required depends upon the proportion of alumina present in the mixture. Thus we have found that if the initial mixture contains 42.5% to 45% of alumina, a firing temperature of 1650° C. is necessary to ensure that all the alumina combines with the free silica produced; the highest firing temperature which we have found can conveniently be achieved is 1600° C. and at this temperature the maximum amount of alumina which will combine with silica is an amount corresponding to 40% of the initial mixture; and it is usually necessary to include a flux in the mixture to ensure that this amount of alumina will combine at 1600° C.

The mixture of raw materials may include a small proportion of a plasticiser for facilitating handling of the mixture; thus the mixture may include up to 7.5% of ball clay, which is similar in composition to china clay but contains slightly greater amounts of impurities: the admixture of a small proportion of ball clay with china clay is a well known expedient to increase the dry strength and plasticity of the china clay, for facilitating handling. The mixture may also contain up to 2.5% of a flux, such as a felspar, in order to reduce the firing temperature required and to facilitate the combination of the alumina with the silica liberated, as indicated above.

Thus the said mixture to be heated, to produce a coherent body of refractory material in accordance with the invention, preferably consists of 50% to 75% china clay, 15% to 40% alumina, 0 to 7.5% ball clay, and 0 to 2.5% flux, the flux being any material whose use for this purpose is well known in the art of manufacturing refractory ceramic materials.

It is essential that sufficient vitreous material should be included in the refractory material of the invention to bond all the mullite crystals together to form a coherent body. In some cases the clay employed, especially if ball clay is included, may contain a large enough proportion of impurities to provide the required vitreous matrix on firing; a flux, if present, will also contribute to the proportion of vitreous matrix present in the final product. However, in general it is preferred to use an amount of alumina insufficient to combine with all the silica so that some free silica is retained to ensure the formation of sufficient vitreous matrix for bonding the whole of the mullite. The use of such an insufficient proportion of aluminia also enables a lower firing temperature to be employed. The proportion of vitreous material in the product should, however, be kept as low as is practicable, having regard to the firing temperature which it is convenient to use, since the presence of an unnecessarily large amount of vitreous matrix tends to reduce the resistance of the product to corrosion in use, for example, in the case of a tank block for a glass furnace the resistance to attack by molten glass is reduced by the presence in the block of an excess of vitreous material.

The firing temperature required varies somewhat according to the composition of the mixture of raw materials fired: thus, as indicated above, the higher the alumina content of the mixture, the higher the firing temperature required, while the incorporation of a flux in the mixture reduces the firing temperature necessary. We have found, for example, that if no flux is present, and if the proportion of alumina used is sufficient to combine with all the silica liberated, a firing temperature of at least 1600° C. should be employed.

If the clay used contains a relatively high proportion of impurities such as felspars and mica, these will perform the function of a flux and thus render the addition of a flux unnecessary. However, it is preferred to use a clay of the highest possible purity and to add a small amount of potash felspar as flux. A body of very suitable properties for use as a glass furnace tank block can be made by using a pure clay and omitting the felspar (or other flux) provided that a sufficiently high firing temperature, above 1600° C., is employed: if no flux is present and the firing temperature is too low, the block obtained is undesirably porous.

We have found that prolonged firing of the mixture of clay and alumina, with or without a flux, at the high temperatures specified, namely above 1500° C., is advantageous for the production of a satisfactory material of the composition according to the invention. Thus, although the reaction is usually complete in a few hours at these temperatures, in order to encourage the growth of mullite crystals and to obtain a material of the desired low porosity, it is preferred to heat the dried mixture of clay and alumina slowly up to a temperature above 1500° C., over a period of several days, and to maintain the material at this temperature for at least one or two days before allowing it to cool slowly. If temperatures below 1500° C., are used, the product is more porous, and hence more liable to disintegrate in contact with molten glass. Hitherto silico-aluminous refractory materials of low porosity have been obtained by heating clay or sillimanite, for example, at temperatures not exceeding 1400° C. with the addition of fluxes, but without added alumina.

The preferred method of shaping the coherent bodies of refractory material of the invention is by slip casting, which method consists essentially in pouring into a plaster mould an aqueous slurry containing the required ingredients, and stripping off the mould when the outside of the block has hardened, the interior of the block being allowed to harden slowly after removal of the mould. This method is preferred because it gives a product of lower porosity than the usual pressing methods. The slurry also contains a small quantity of one or more deflocculating agents such as sodium silicate and sodium carbonate.

Hence the preferred method, according to the invention, of manufacturing refractory blocks for use in the construction of tank furnaces for glass manufacture comprises making an aqueous slurry containing china clay and calcined alumina, and possibly ball clay and a flux, in the desired proportions, and containing also small proportions of sodium silicate and sodium carbonate, casting this slurry into a plaster mould, drying the casting and stripping off the mould, and heating the cast block for at least 24 hours at a suitable temperature above 1500° C.

In the mixture employed according to the invention for manufacturing coherent bodies, such as glass furnace tank blocks, and particularly in the slurry employed for slip-casting such bodies as described above, a proportion of the china clay is preferably in the form of china clay "grog," that is to say china clay which has been previously dehydrated and calcined. The incorporation of china clay grog into the mixture is advantageous in that this material has already been shrunk, and therefore the partial replacement of the raw china clay in the mixture by this material reduces the amount of shrinkage of the moulded blocks on heating. The proportion of grog used may be between 20% and 60% of the total mixture.

Some examples of the preferred method of manufacturing refractory blocks in accordance with the invention, for use in the construction of glass tank furnaces, are given below. The clays employed in these examples were found on analysis to have the following compositions in percentages by weight of the dried and ignited material:

|  | China Clay | Ball Clay |
|---|---|---|
| $SiO_2$ | 53.48 | 58.90 |
| $Al_2O_3$ | 45.11 | 35.60 |
| $FeO_2$ | 0.38 | 1.19 |
| $TiO_2$ | 0.01 | 1.12 |
| MgO | 0.18 | 0.25 |
| CaO | 0.16 | 0.30 |
| $K_2O$ | 0.56 | 1.50 |
| $Na_2O$ |  | 0.52 |
| $SO_3$ |  | 0.10 |

*Example 1*

A slurry of the following composition is prepared, percentages being by weight:

Per cent
Raw china clay (in suspension in water) _____ 40
Calcined china clay grog _____ 44
Calcined alumina _____ 16

The suspending water contains, as deflocculating agents, sodium silicate and sodium carbonate in the proportions of 0.4% and 0.1% respectively by weight of the weight of the raw china clay.

This slurry is poured into plaster moulds and allowed to stand until the outsides of the blocks within the moulds have hardened. The plaster is then stripped off the blocks and the latter are allowed to stand at room temperature for a further period of time sufficient to ensure that the interiors of the blocks have dried off and hardened. The blocks are then heated in a furnace at a slow rate to 1600° C., and are maintained at this temperature for 2 days, before being allowed to cool slowly to room temperature. The rate of heating and cooling depends upon the size, and especially the thickness, of the blocks; for example, blocks measuring 30″ × 24″ × 8″ are heated up to 1600° C. in a period of 10 to 12 days, are held at this temperature for two days, and are then cooled to room temperature in a further period of 7 or 8 days.

Three further examples of compositions of mixtures employed for the manufacture of tank blocks, by slip-casting in the form of slurries as described in Example 1, are given in the following table, the firing temperature employed being indicated in each case, and the firing times being as stated in Example 1; the figures are percentages by weight.

| Example | II | III | IV |
|---|---|---|---|
| Raw china clay | 30 | 30 | 30 |
| Ball clay | 7.5 | 7.5 | 7.5 |
| Calcined china clay (grog) | 45 | 20 | 20 |
| Alumina | 15 | 42.5 | 40 |
| Potash felspar | 2.5 |  | 2.5 |
| Firing temperature °C. | 1,550 | 1,650 | 1,600 |

If the felspar is omitted from the composition of Example II this mixture should be fired at a temperature of at least 1600° C.

The advantages which can be achieved by incorporating alumina in the material used for the manufacture of refractory materials in accordance with the invention may be illustrated by a comparison of the measured properties of refractory blocks which were made by a method in accordance with the invention with those of blocks made by previously known methods. In the following table the values of creep strength, or rate of flow at high temperatures, and corrosion index of three fire clay tank blocks of the usual type (A, B, C) are compared with those of three tank blocks (D, E, F) made from china clay and alumina in accordance with the present invention. The creep strength was measured as the rate of flow under a load of 500 gms. per sq. cm. at 1350° C., and the corrosion index as the weight (in grams) of the block dissolved in 100 gms. of molten glass at 1400° C.

| Block | Creep strength (as defined above) mms. × 10⁻⁴ per mm. per hour | Corrosion index, gms. block dissolved in 100 gms. molten glass |
| --- | --- | --- |
| A | 100 | 7.7 |
| B | 90 | 3.1 |
| C | 37 | 5.8 |
| D | 0.6 | 1.9 |
| E | 0.8 | 1.5 |
| F | 0.7 | 0.6 |

We claim:

1. A method of manufacturing a coherent low porosity body of refractory material of the silico-aluminous type which comprises the steps of preparing a mixture consisting essentially of china clay and substantially pure alumina such that the proportion of alumina is between 15% and 45% by weight of the mixture, moulding the said mixture to a desired shape by the method of slip-casting, and heating the said mixture at a temperature above 1500° C. but below the fusion temperature of the mixture until all the alumina is combined with silica in the form of mullite.

2. A method according to claim 1 wherein the said mixture also includes a plastic clay.

3. A method according to claim 1 wherein the said mixture also includes a felspar as flux.

4. A method of manufacturing a coherent low porosity body of a refractory material of the silico-aluminous type which comprises the steps of preparing a mixture having a composition consisting essentially, by weight, of 50% to 75% china clay, 15% to 40% calcined alumina, not more than 7.5% ball clay, and not more than 2.5% potash felspar, moulding the said mixture to a desired shape by the method of slip-casting, and heating said mixture for at least 24 hours at a temperature of 1600° C.

5. A method according to claim 4 wherein a proportion of the china clay corresponding to between 20% and 60% by weight of the said mixture is in the form of calcined china clay.

6. A method of manufacturing a refractory block of low porosity for use in the construction of a tank furnace for glass manufacture which comprises the steps of preparing a mixture consisting essentially of china clay, ball clay and alumina, the proportion of alumina being between 15% and 45% by weight of the mixture and the proportion of ball clay being not greater than 7.5% by weight of the mixture, moulding the said mixture to the shape of a tank block by the method of slip-casting and heating the said mixture at a temperature above 1600° C. until all the alumina is combined with silica in the form of mullite.

7. A method of manufacturing a coherent low porosity body of refractory material of the silico-aluminous type which comprises the steps of preparing a mixture consisting essentially of china clay and alumina such that the proportion of alumina is between 15% and 45% by weight of the mixture, forming said mixture into a slurry with water containing a small quantity of a deflocculating agent, casting the slurry in a plaster mould, drying the casting, stripping the mould off the casting and heating the casting at a temperature above 1500° C. but below the fusion temperature of the said mixture until all the alumina is combined with silica in the form of mullite.

8. A method according to claim 7 wherein the deflocculating agent consists of a mixture of sodium silicate and sodium carbonate.

9. A method of manufacturing a coherent low porosity body of refractory material of the silico-aluminous type which comprises the steps of preparing a mixture having a composition consisting essentially, by weight, of 50% to 75% china clay, 15% to 40% calcined alumina, not more than 7.5% ball clay and not more than 2.5% potash felspar, forming said mixture into a slurry with water containing a small quantity of a deflocculating agent, casting the slurry into a plaster mould, drying the casting, stripping the mould off the casting and heating the casting for at least 24 hours at a temperature of 1600° C.

10. A method of manufacturing a refractory block of low porosity for use in the construction of a tank furnace for glass manufacture which comprises the steps of forming a mixture consisting of, by weight, 40% raw china clay, 44% calcined china clay, and 16% calcined alumina into a slurry with water containing sodium silicate and sodium carbonate in the proportions of 0.4% and 0.1% respectively by weight of the weight of the raw china clay, pouring the said slurry into a plaster mould in the shape of a tank block, allowing the mould to stand until the outside of the block within the mould has hardened, stripping the plaster mould off the block, allowing the block to stand at room temperature until the interior thereof has dried and hardened, heating the block slowly in a furnace to a temperature of 1600° C., maintaining the block at 1600° C. for two days and allowing the block to cool slowly to room temperature.

11. A method of manufacturing a refractory block of low porosity for use in the cnstructin of a tank furnace for glass manufacture which comprises the steps of forming a mixture consisting of, by weight, 30% raw china clay, 7.5% ball clay, 45% calcined china clay, 15% calcined alumina and 2.5% potash felspar into a slurry with water containing sodium silicate and sodium carbonate in the proportions of 0.4% and 0.1% respectively by weight of the weight of the raw china clay, pouring the said slurry into a plaster mould in the shape of a tank block, allowing the mould to stand until the outside of the block within the mould has hardened, stripping the plaster mould off the block, allowing the block to stand at room temperature until the interior thereof has dried and hardened, heating the block slowly in a furnace to a temperature of 1550° C., maintaining the block at 1550° C. for two days and allowing the block to cool slowly to room temperature.

12. A method of manufacturing a refractory block of low porosity for use in the construction of a tank furnace for glass manufacture which comprises the steps of forming a mixture consisting of, by weight, 30% raw china clay, 7.5% ball clay, 20% calcined china clay, and 42.5% calcined alumina into a slurry with water containing sodium silicate and sodium carbonate in the proportions of 0.4% and 0.1% respectively by weight of the weight of the raw china clay, pouring the said slurry into a plaster mould in the shape of a tank block, allowing the mould to stand until the outside of the block within the mould has hardened, stripping the plaster mould off the block, allowing the block to stand at room temperature until the interior thereof has dried and hardened, heating the block slowly in a furnace to a temperature of 1650° C., maintaining the block at 1650° C. for two days and allowing the block to cool slowly to room temperature.

13. A method of manufacturing a refractory block of low porosity for use in the construction of a tank furnace for glass manufacture which comprises the steps of forming a mixture consisting of, by weight, 30% raw china clay, 7.5% ball clay, 20% calcined china clay, 40% calcined alumina, and 2.5% potash felspar into a slurry with water containing sodium silicate and sodium carbonate in the proportions of 0.4% and 0.1% respectively by weight of the weight of the raw china clay, pouring the said slurry into a plaster mould in the shape of a tank block, allowing the mould to stand until the outside of the block within the mould has hardened, stripping the plaster mould off the block, allowing the block to stand at room temperature until the interior thereof has dried and hardened, heating the block slowly in a furnace to a temperature of 1600° C., maintaining the block at 1600° C. for two days and allowing the block to cool slowly to room temperature.

References Cited in the file of this patent

UNITED STATES PATENTS

| Number | Name | Date |
|---|---|---|
| 1,644,244 | Freed | Oct. 4, 1927 |
| 1,769,297 | Lambie et al. | July 1, 1930 |
| 1,802,296 | Willetts | Apr. 21, 1931 |
| 1,897,183 | White | Feb. 14, 1933 |

FOREIGN PATENTS

| Number | Country | Date |
|---|---|---|
| 463,067 | Great Britain | 1937 |